United States Patent
Coq et al.

(10) Patent No.: US 6,221,324 B1
(45) Date of Patent: Apr. 24, 2001

(54) PROCESS FOR THE REMOVAL FROM GASES OF NITROGEN OXIDES $NO_x$ BY SELECTIVE CATALYTIC REDUCTION (SCR) USING AMMONIA OVER ZEOLITE CATALYSTS NOT CAUSING THE FORMATION OF NITROGEN PROTOXIDE

(75) Inventors: Bernard Coq; Gerard Delahay; Francois Fajulas, all of Montpellier Cedex; Bernard Neveu, Puteaux; Jean-Bernard Peudpiece, Mont Saint Aignan; Stéphane Kieger, Haguenau, all of (FR)

(73) Assignee: Grand-Paroiesse S.A., Puteaux (FR)

( * ) Notice: Subject to any disclaimer, the term of this patent is extended or adjusted under 35 U.S.C. 154(b) by 0 days.

(21) Appl. No.: 09/182,649

(22) Filed: Oct. 30, 1998

(30) Foreign Application Priority Data

Nov. 4, 1997 (FR) .................................................. 97 13861

(51) Int. Cl.[7] ................................. B01J 8/00; B01J 29/04
(52) U.S. Cl. ..................... 423/239.2; 423/213.2; 502/65; 502/67; 502/75
(58) Field of Search ............................... 423/235, 239.1, 423/239.2, DIG. 21, 213.2; 502/63, 64, 65, 67, 69, 79, 73

(56) References Cited

U.S. PATENT DOCUMENTS

| 4,052,337 | * 10/1977 | Nishikawa | 423/239 |
|---|---|---|---|
| 5,141,737 | 8/1992 | Iwamoto et al. | 423/328 |
| 5,207,893 | 5/1993 | Iwamoto et al. | 208/111 |
| 5,234,876 | 8/1993 | Swaroop et al. | 502/79 |
| 5,270,024 | 12/1993 | Kasahara et al. | 423/213.2 |
| 5,536,483 | 7/1996 | Descat et al. | 423/239.2 |

FOREIGN PATENT DOCUMENTS

| 44 43 301 | 6/1996 | (DE) . |
|---|---|---|
| 384 186 | 8/1990 | (EP) . |
| 415 410 | 3/1991 | (EP) . |
| 483 201 | 5/1992 | (EP) . |

OTHER PUBLICATIONS

"Characterized Catalysts via Temperature–Programmed Reduction", Chemtech, J.W. Jenkins, B.D. McNicol and S.D. Robertson, pp. 316–302, May 1997.

"*Catal. Today*", H. Bosch and F. Janssen, p. 369, 1988 (not available).

"*Handbook of Chemistry and Physics*", CRC Press, F–209, 56th edition, 1975–1976 (not available).

"*Characterization of Heterogeneous Catalysts*", Marcel Dekker, p. 34, F. Delannay (Ed.), New York, 1984 (not available).

* cited by examiner

Primary Examiner—Steven P. Griffin
Assistant Examiner—Maribel Medina
(74) Attorney, Agent, or Firm—Smith, Gambrell & Russell, LLP

(57) ABSTRACT

Zeolites partially exchanged with copper, in particular faujasites, in which the copper does not largely occupy the small cages (for example the sodalite cages of the faujasites), are used as non-nitrogen-protoxide-generating SCR catalysts. Particular attention is drawn to certain mixed rare-earth/copper zeolites. The selectivity of the reduction of NOx to $N_2$ is correlated with the TPR diagram of the catalysts.

12 Claims, 6 Drawing Sheets

STRUCTURE OF THE CUBIC FAUJASITE (FAU)

STRUCTURE OF THE CUBIC FAUJASITE (FAU)

PROCESS FOR THE REMOVAL FROM GASES OF NITROGEN OXIDES NO$_X$ BY SELECTIVE CATALYTIC REDUCTION (SCR) USING AMMONIA OVER ZEOLITE CATALYSTS NOT CAUSING THE FORMATION OF NITROGEN PROTOXIDE

FIELD OF THE INVENTION

The present invention relates to the destruction of nitrogen oxides in gases such as combustion gases or the effluents from nitric acid synthesis plants, using the process of selective catalytic reduction (SCR) using ammonia.

BACKGROUND OF THE INVENTION

It is known that nitrogen oxides (NO and NO$_2$, hereafter NOx) can be reduced to nitrogen N$_2$ by selective reduction using ammonia (H. Bosch and F. Janssen, Catal. Today, 1988, 369) and thus that these compounds, which are known to contribute to the formation of photochemical fog and acid rain, can be removed from gases discharged into the atmosphere. The reduction of NOx would essentially follow the reactions obeying the following overall equations:

$$NO_2+4/3NH_3 \rightarrow 7/6N_2+2H_2O$$

which take place catalytically. Among the catalysts employed, industry has in particular adopted cubic faujasites (FAU) exchanged with copper (European Patent EP 0,483, 201 and U.S. Pat. No. 5,536,483) which have excellent activity in the 250–400° C. temperature window and which are particularly well suited to the treatment of tail gases from most nitric acid plants. Until recently, the presence of nitrogen protoxide (N$_2$O) in these discharges was barely a matter of concern, this being a gas deemed to be harmless because it is not involved in the formation of acid rain, until account is taken of its not insignificant contribution to the greenhouse effect. Its removal has thus become a concern of public services and industrial companies. It turns out that the gases treated by SCR using ammonia on most catalysts of the prior art, especially on examples of faujasite Y exchanged with copper, may give rise, in certain temperature windows, to the formation of N$_2$O.

It is now known, in particular by the use of the profiles of NOx SCR by NH$_3$, to distinguish two waves of NO reduction, respectively around 230° C. and above 325° C., and it may be noted in this temperature range that a parasitic reaction of a reduction of NO to nitrogen protoxide N$_2$O takes place. It has been possible to correlate this N$_2$O formation with a temperature-programmed reduction (TPR) profile, using hydrogen, of the "copper" species in the catalyst, according to a method which was explained in "Characterized Catalysts via Temperature-Programmed Reduction", Chemtech, 1977, 316–302, by J. W. Jenkins, B. D. McNicol and S. D. Robertson, which authors have developed the TPR technique with analysis by a catharometric cell. The corresponding experimental process is developed below in terms of examples.

DESCRIPTION OF THE INVENTION AND BRIEF DESCRIPTION OF THE DRAWINGS

It has just been discovered, and it is this which is the basis of the present invention, that certain doubly exchanged copper zeolites do not generate N$_2$O over the range of SCR reduction operating temperatures.

The zeolites are microporous crystalline aluminosilicates of general formula:

in which

M is the compensating cation for the negative charge generated by replacing SiO$_4$ tetrahedra by AlO$_4$ tetrahedra, n is the oxidation state of M, f is the number of AlO$_2$ moles per unit cell, g is the number of SiO$_2$ moles per unit cell, h is the number of H$_2$O moles per unit cell.

The SCR catalysts of the prior art are examples of cubic faujasite Y (i.e. those having an Si/Al molar ratio >2.5), the copper of which is the active ion among the compensating ions imposed by the final Si/Al ratio of the zeolite. They will be represented here by in which Y represents a cubic faujasite (FAU) lattice, x is the theoretical degree of copper-ion exchange, expressed as a percentage of the total exchange capacity of the said faujasite, M being H$^+$, Na$^+$, K$^+$, NH$_4^+$ or any other cation having the degree of saturation necessary to ensure electrical neutrality of the structure.

Figure 1:
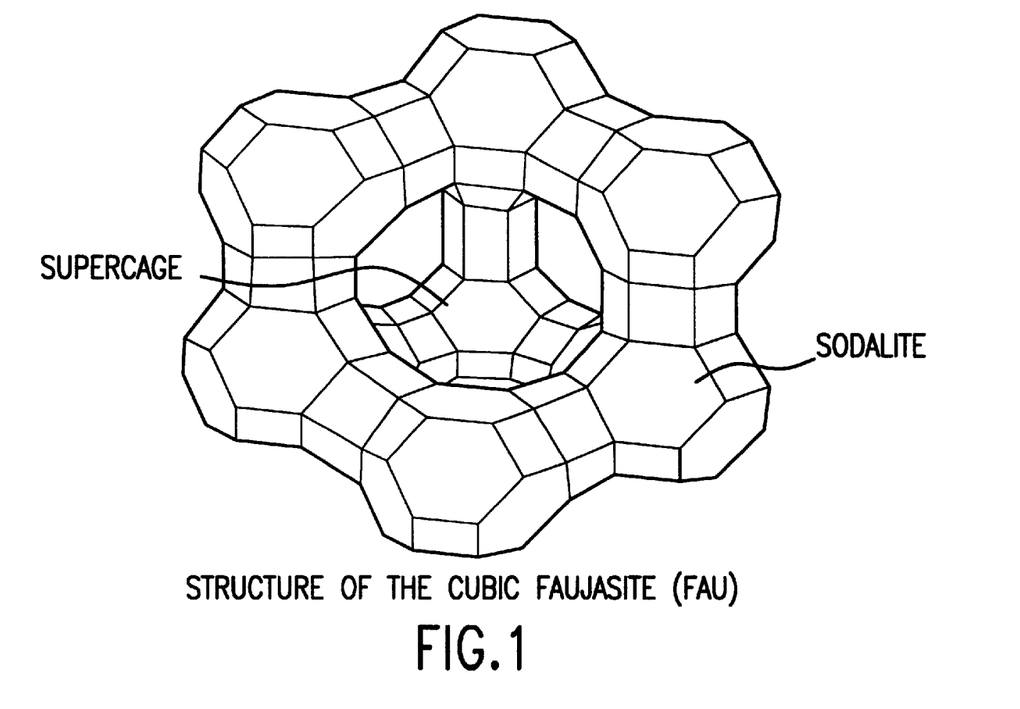
FIG. 1 shows a faujasite structure.

The proportion and location of copper ions within the faujasite structure are certainly not independent of its SCR activity and the parasitic production of N$_2$O. FIG. 1 accounts for this structure in which may be distinguished an arrangement of SiO$_4$/AlO$_4$ tetrahedra in truncated cuboctahedra called sodalite cages or β cages, these communicating via hexagonal prisms and defining larger cavities, the α cages or supercages. Per crystal unit cell of cubic faujasite (FAU), there are 16 hexagonal prisms, 8 sodalite cages and 8 supercages. The diameters of these cavities and their openings are as follows:

|  | Supercage | Sodalite cage | Hexagonal prism |
| --- | --- | --- | --- |
| Cavity diameter (nm) | 1.3 | 0.66 |  |
| Opening diameter (nm) | 0.74–0.9 | 0.22–0.26 | 0.24 |

Figure 2:
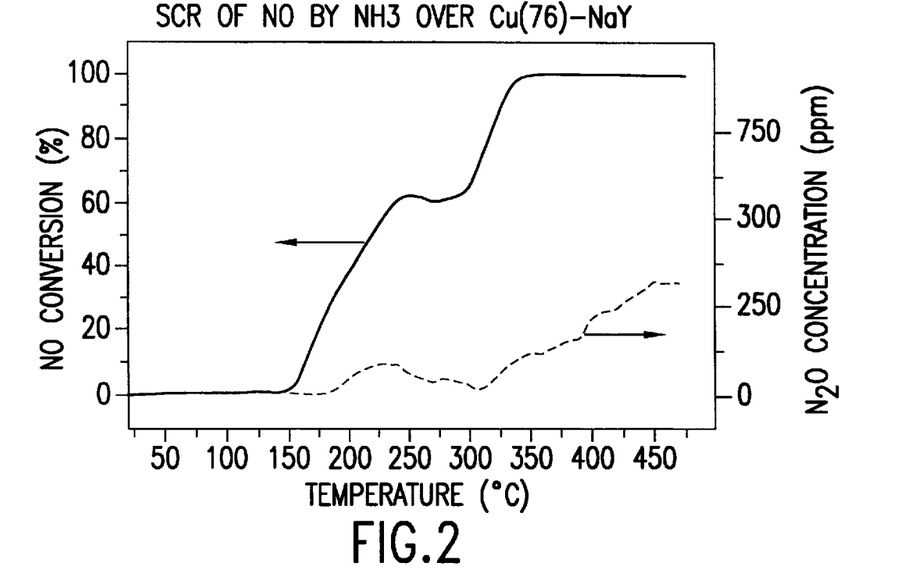
FIGS. 2–10 graphically depict results of experiments described in the specification.
Figure 3:
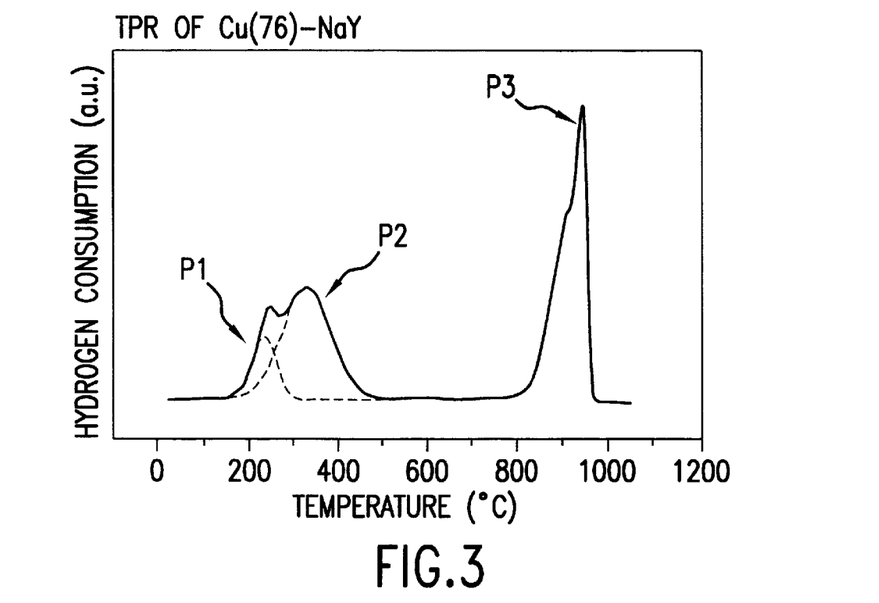

In respect of the SCR profile of a copper-exchanged faujasite Y of formula Cu(76)—NaY (the symbol —NaY indicating that, in this particular case, the exchange was carried out on a sodium faujasite Y) for NO conversion and N$_2$O production (FIG. 2), two NO conversion waves, near 230° C. and above 325° C. and two N$_2$O formation waves at 240° C. and above 310° C. may be identified. At the same time, the hydrogen TPR diagram of this Cu(76)—NaY shows two peaks P$_1$ and P$_2$ resolved by Gaussian deconvolution, at 222° C. and at 327° C. respectively for the low-temperature range (<800° C.) and one peak at 952° C. for the high-temperature range (>800° C.), the ratio of the areas A$_1$/A$_2$ corresponding to the peaks P$_1$ and P$_2$ respectively being less than 1.5 in this specific case (FIG. 3). The interpretation of this that is given is that copper is to a large degree localized in the sodalite cages and that it contributes to the generation of N$_2$O.

Figure 4:
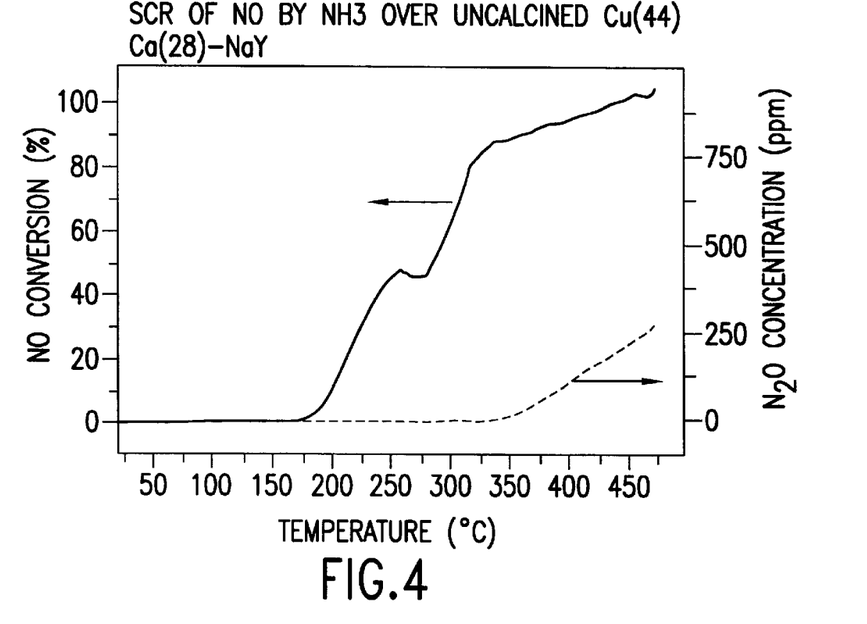

The SCR and TPR profiles of a faujasite Y ordinarily doubly exchanged with copper and with calcium, and satisfying the formula Cu(44)Ca(28)—NaY (FIGS. 4 and 5) are not substantially different from those of a Cu(76)—NaY faujasite and display a behaviour which is interpreted in the same way.

If the SCR and TPR profiles of a copper and calcium doubly-exchanged faujasite are now examined, but using the particular operating method consisting in firstly carrying out the partial calcium exchange, in calcining the result of this first exchange and then in continuing with a copper second exchange, a modification of the TPR diagram (FIG. 5) is observed, this diagram no longer including a single low-temperature copper reduction wave around 247° C. and the SCR profile (FIG. 6) no longer displays $N_2O$ production. The interpretation of this that is given is that in this copper faujasite, which always brings about the catalytic destruction of No but no longer generates $N_2O$, the copper is mostly located in the large cages.

The invention consists in developing this observation, in applying it to the SCR of nitrogen oxides NOx using ammonia, without generating $N_2O$, and in generalizing it to other zeolites as catalytic means of this process. There is no reason to limit the invention to examples of faujasite Y, and faujasites having an Si/Al ratio of from 1 to 20 form part of the invention. It has been verified that the property extended not only to faujasites having sodalite cages in their structure but also to zeolites in which the structural arrangement of the $SiO_4$ and $AlO_4$ tetrahedra provides both small cavities accessible through windows having 6 tetrahedra and large cavities accessible through windows formed by at least 8 tetrahedra, and the copper of which occupies only the large cavities.

In order to confer practical reality on the latter proposal, what is demanded of the TPR is to provide its measurable characteristic. These solids having small cavities essentially free of copper and large cavities in which the copper is mainly housed are those which have two waves of hydrogen consumption in temperature-programmed reduction, the first wave at a temperature below 800° C., mainly attributed to the reduction of $Cu^{2+}$ ions into $Cu^+$ ions of the copper localized in the large cavities, the second above 800° C. which is attributed to the reduction of $Cu^+$ ions to $Cu^0$ (metallic copper), the hydrogen consumption corresponding to this second peak being substantially equal to half a mole of hydrogen per mole of copper existing in the solid. The first wave (<800° C.) is composed of two peaks $P_1$ and $P_2$ resolved by Gaussian deconvolution and the ratio of the areas $A_1/A_2$ corresponding to the peaks $P_1$ and $P_2$ respectively is greater than 1.5.

The advantageous behaviour of the zeolites according to the invention is obtained only for sufficient degrees of copper exchange. However, on the other hand, the copper in too highly exchanged copper zeolites ends up being in states which are not those desired either because an increasing part of the copper occupies the small cages or because the copper in the large cages is concentrated in the form of clusters, or even because there is no longer exchange proper but impregnation by means of which at least a significant part of the copper is not incorporated within the zeolite structure. Again, it is necessary to consider as copper zeolites of the invention only those for which the degree of copper exchange is from 5 to 60%.

By virtue of these conditions and these delimitations, the invention may thus be described: in a process for the catalytic reduction of nitrogen oxides, the improvement which consists in using as catalyst a partially copper-exchanged zeolite not generating nitrogen protoxide, the said zeolite being a zeolite having an Si/Al ratio of 0.8 to 20, of which the structural arrangement of its $SiO_4$ and $AlO_4$ tetrahedra provides both small cavities accessible through windows having 6 tetrahedra and large cavities accessible through windows formed by at least 8 tetrahedra, of which the degree of copper exchange is from 5 to 60%, such a solid being characterized by two waves of hydrogen consumption in temperature-programmed reduction, the first wave at a temperature below 800° C., the second above 800° C., the hydrogen consumption corresponding to the second peak being substantially equal to half a mole of hydrogen per mole of copper present in the solid, the first wave being composed of two peaks $P_1$ and $P_2$ resolved by Gaussian deconvolution and the ratio of the areas $A_1/A_2$ corresponding to the peaks $P_1$ and $P_2$ respectively being greater than 1.5.

Suitable for the invention are the partially copper-exchanged zeolites of the families of cubic faujasite (FAU), hexagonal faujasite EMT, intergrowths of cubic faujasite (FAU) and hexagonal faujasite (EMT), (in particular ZSM-3, ZSM-20, CSZ-1 and ECR-30), zeolite L and offretite.

For some of these zeolites, the desired result is obtained by simple copper exchange, by which copper spontaneously enters only the large cavities of the structure. Such is the case for offretites (OFF). In respect of the other zeolites, in particular the faujasites, it is necessary to prevent copper from entering the small cavities, and this is achieved by carrying out a double exchange, the first with cations which are compelled to occupy the small cages and the second with copper which occupies the supercages. What has been recognized as being suitable for the first exchange are the metallic elements M' of valency 2, 3 or 4, the cations of which have a diameter of between 0.16 and 0.28 nm.

Preferred means of the invention are thus examples of faujasite satisfying a general formula in which FAU represents a cubic faujasite lattice of Si/Al ratio of 0.8 to 20,

M' is a metallic element of valency 2, 3 or 4, having an ion diameter of between 0.16 and 0.28 nm (for ion diameters or radii, see Handbook of Chemistry and Physics, 56th edition, 1975–1976, CRC Press, F-209), M is H, Na, K, x, y and z are the respective theoretical degrees of exchange of copper ions, M' ions and M ions, expressed as a percentage of the total exchange capacity of the said faujasite, x, y and z having values such that:
$5 \leq x \leq 60$,
$20 \leq y \leq 70$,
$z \leq 100-x-y$.

specially faujasites Y in which Y is, as above, a cubic faujasite with a Si/Al ratio >2,5.

In fact, the occupation of the sites constituting the small cages by M' type ions is only suitably ensured if a calcining operation is carried out after the first exchange. The effect of this intermediate calcining is very clearly demonstrated the TPR diagrams of faujasites Y Cu(44)Ca(28)NaY and Cu(36) Ca(51)NaY in FIG. 5 which respectively have not undergone calcining and have undergone an intermediate calcining operation. In the second case, the peak $P_2$ is highly attenuated, indicating the preferential occupation of the small cages by the calcium ion. All the advantages of the CaCuY calcium-copper-faujasite structures, as may be achieved by this process, may be appreciated in FIg. 6. This calcining is carried out at a temperature high enough to remove the anion ($NO_3^-$, $SO_4^{2-}$, $CO_3^{2-}$, $Cl^-$, etc.) which accompanies the copper cation during the exchange. In practice, this temperature is 350 to 650° C.

Figure 7:
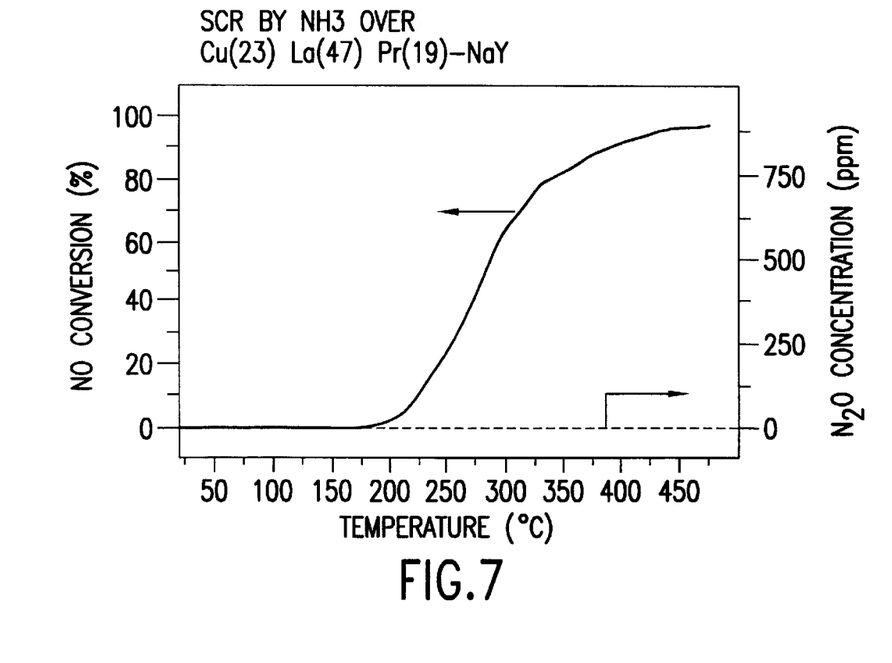

In the same way, zeolites exchanged with rare earths, and in particular the TrCuY mixed rare-earth/copper faujasites, prove to be remarkable SCR catalysts which do not generate $N_2O$ and which, in addition, accomplish the complete conversion of NOx at temperatures substantially below those of the conventional catalysts for the same copper content (see FIG. 7, SCR by $NH_3$ over Cu(23)La(47)Pr(19)—NaY). These products are industrially obtainable by exchange using solutions of cerium or lanthanum salts, but especially using commercially available lanthanide salts. These are novel products which, as they are, also form part of the present invention.

The process for treating gases by selective catalytic reduction of nitrogen oxides in oxygen-containing gases containing them, which according to the invention does not generate nitrogen protoxide and which consists in passing the said gases which, in the case of effluents from nitric acid plants, contain from 0.02 to 0.6% of NOx, from 1.5 to 3% of $O_2$ and from 0.3 to 2.5% of $H_2O$, at temperatures of between 180 and 500° C., at total pressures of between atmospheric pressure and 15 bar, over a so-called SCR catalyst, is very simply adapted from the process of the prior art by purely and simply replacing the conventional catalyst with the catalyst of the invention.

The non-limiting examples which follow will make the invention clearly understood.

EXAMPLES

The examples which follow make reference to the TPR profiles. The experimental TPR method is derived from the now-classical method of J. L. Lemaitre, Characterization of Heterogeneous Catalysts, Marcel Dekker, 34, F. Delannay (Ed.), New York, 1984). The present TPR profiles were obtained under the following conditions:

the reducing gas is a hydrogen/argon (3/97 vol/vol) mixture with a flow rate of 18.5 cm³/min;

the detector is the thermal conductivity detector provided with Shimadzu GCB chromatographs;

temperature change from 25 to 905° C. at a rate of 9° C. per minute;

the test sample is the catalyst, 50 mg, firstly activated at 550° C. for 1 hour after a temperature rise at a rate of 5° C. per minute in the helium (flow rate of 13.6 cm³/min).

Example 1

Preparation of a CuCa—NaY Catalyst According to the Invention.

A mixed Cu(36)Ca(51)—NaY faujasite is prepared according to the following operating procedure.

1) 0.74 g of calcium nitrate is dissolved in a 500 ml aqueous solution at pH=7.

2) 2 g of the Sud Chemie CBV 100 support is added, V/m=250 ml/g, this being a sodium cubic faujasite Y.

3) The solution is stirred for 24 hours.

4) The solution is centrifuged, the liquid phase thrown away, the cake washed with 100 ml of water at pH=7 and centrifuged, and the liquid phase thrown away.

5) The cake is dried for 1 hour at approximately 80° C.

6) The solid is calcined by raising the temperature from ambient to 500° C. (3° C./min) with a temperature hold of 24 hours at 500° C. The result is a Ca(57)—NaY.

7) 0.80 g of copper nitrate is dissolved in a 500 ml aqueous solution at pH=5.

8) The CaY obtained at 6) is added, V/m=250 ml/g.

9) The solution is stirred for 24 hours.

10) The solution is centrifuged, the liquid phase is thrown away, the cake is washed with 100 ml of water at pH=5 and centrifuged, and the liquid phase is thrown away.

11) The cake is dried for 1 hour at approximately 80° C.

12) The solid is calcined by raising the temperature from ambient to 500° C. (3° C./min) with a temperature hold of 24 hours at 500° C.

A powder is obtained which is analysed to have the composition of a Cu(36)Ca(51)—NaY namely, by weight, Si=23.5%, Al=9.98%, Na=1.09%, Cu=4.25% and Ca=3.78%.

Example 2

Preparation of a CuCa—NaY Catalyst not according to the Invention.

The operating procedure of Example 1 is reproduced, the difference being that the calcining operation 6) was omitted. A powder is thus obtained which is analysed as having the composition of a Cu(44)Ca(28)—NaY namely, by weight, Si=21.4%, Al=8.01%, Na=1.92%, Cu=4.13% and Ca=1.67%.

Example 3

Preparation of Various Cu(x)—NaYs

The following operating method is used to prepare a) Cu(76)—NaY, b) Cu(56)—NaY and c) Cu(37)—NaY:

1) Respectively a) 0.76 g, b) 0.42 g and c) 0.28 g of copper nitrate are dissolved in 500 ml of water and the pH is adjusted to 5.

2) 2 g of the Süd Chemie CBV 100 support is added, V/m=250 ml/g.

3) The solution is kept stirred for 24 hours.

4) The solution is centrifuged, the liquid phase is thrown away, the cake is washed with 100 ml of water at pH=5 and centrifuged, and the liquid phase is thrown away.

5) The cake is dried for 1 hour at approximately 80° C.

6) The solid is calcined by raising the temperature from ambient to 500° C. (3° C./min) with a temperature hold of 24 hours at 500° C.

Powders are thus obtained which are analysed as having the composition:

a) of a Cu(76)—NaY with, by weight, Si=22.25%, Al=8.09%, Na=1.97% and Cu=7.24%;

b) of a Cu(56)—NaY with, by weight, Si=22.08%, Al=8.68%, Na=3.12% and Cu=5.72%;

c) of a Cu(37)—NaY with, by weight, Si=23.22%, Al=8.75%, Na=4.56% and Cu=3.84%.

Example 4

Comparison of the CuCa—NaYs of Examples 1 and 2 and the Cu(76)—NaY of Example 3.

Figure 5:
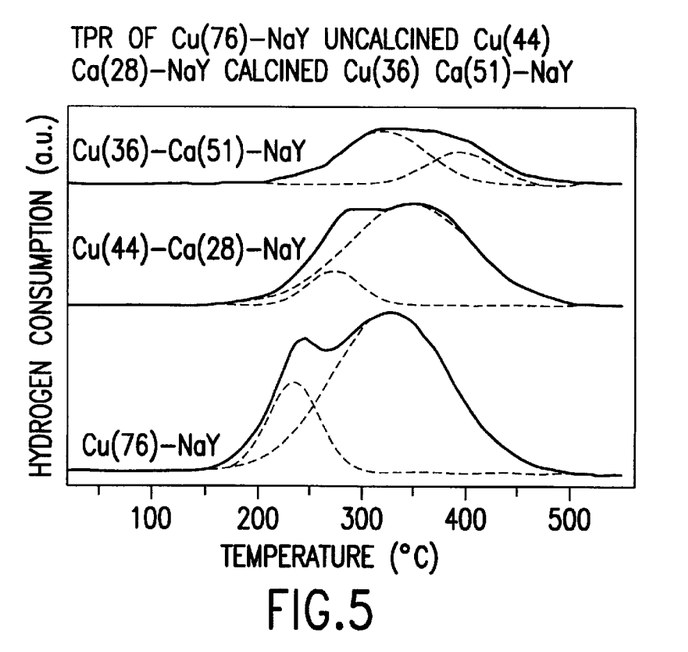

FIG. 5 reproduces the TPR profiles of these three zeolites. It is found that the "uncalcined" CuCa—NaY and the Cu(76)—NaY both have a large peak $P_2$ area, while this is very small in respect of the Cu(36)Ca(51)—NaY according to the invention.

Figure 6:
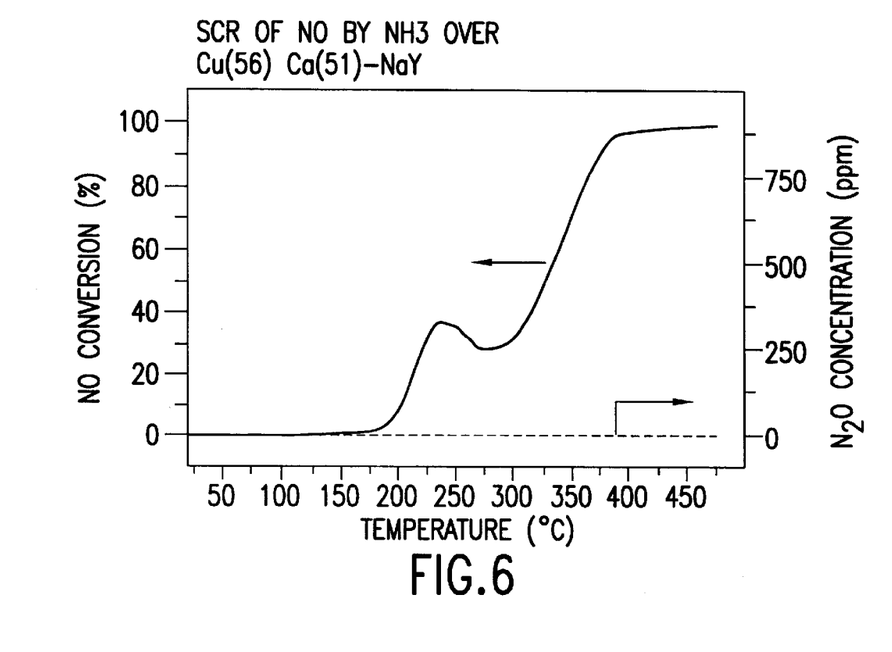

NO SCR profiles, interpreted in terms of $N_2O$ selectivity, show the generation of $N_2O$ with the comparison products Cu(76)—NaY (FIG. 2) and uncalcined Cu(44)Ca(28)—NaY (FIG. 4) and the absence of N₂O with the Cu(36)Ca(51)—NaY according to the invention (FIG. 6).

Example 5

There are reported some results obtained on a pilot unit for selective catalytic reduction of nitrogen oxides by $NH_3$ in which the gases, NOx, $NH_3$ and $O_2$, circulate on 30 grams of catalyst, at a spatial speed (VVH) form 10 000 to 20 000 $h^{-1}$, the temperatures being 453, 538 and 653 K. On Table thereunder, the figures are those of $N_2O$ selectivity, for a NO conversion of 99%.

| $N_2O$ (%) selectivity | 453φK 10 000h⁻¹ | 653φK 10 000h⁻¹ | 538φK 20 000h⁻¹ |
|---|---|---|---|
| Cu (76) -NaY | 19,6 | 33,2 | 12,8 |
| Cu (36) Ca (51) NaY | 7,2 | 5,2 | 5,6 |

Example 6

Cu(195)NaY

A Cu(195)—NaY is produced by impregnation using the following operating procedure.

2 g of Sud Chemie CBV 100 NaY are impregnated with 5 ml of an aqueous copper nitrate solution. The solid is then dried at 353K then step 6) of example 3.

Figure 8:
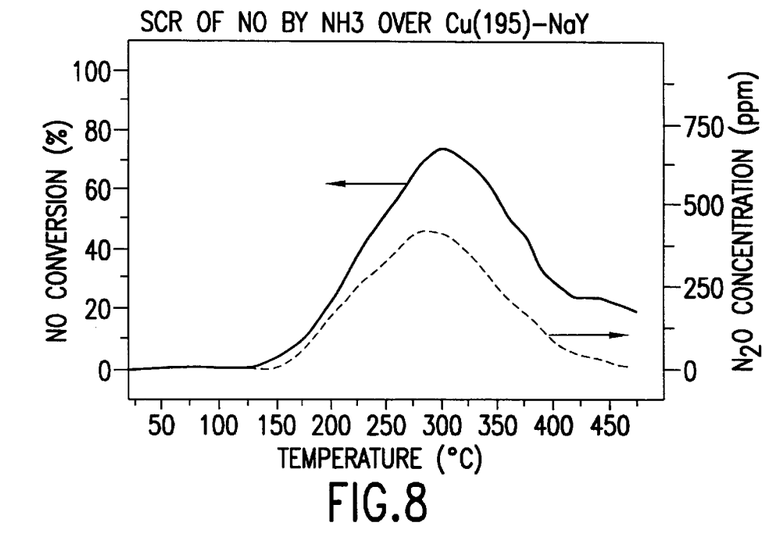

A powder is obtained which is analysed as having the composition of a Cu(195)—NaY, namely, by weight, Si=20.84%, Al=7.69%, Na=6.08% and Cu=17.65t. 80% of the fixed copper is attributed to the formation of CuO. The SCR curve obtained with this catalyst (FIG. 8) shows strong $N_2O$ production.

Example 7

Influence of the M' Ion

Figure 9:
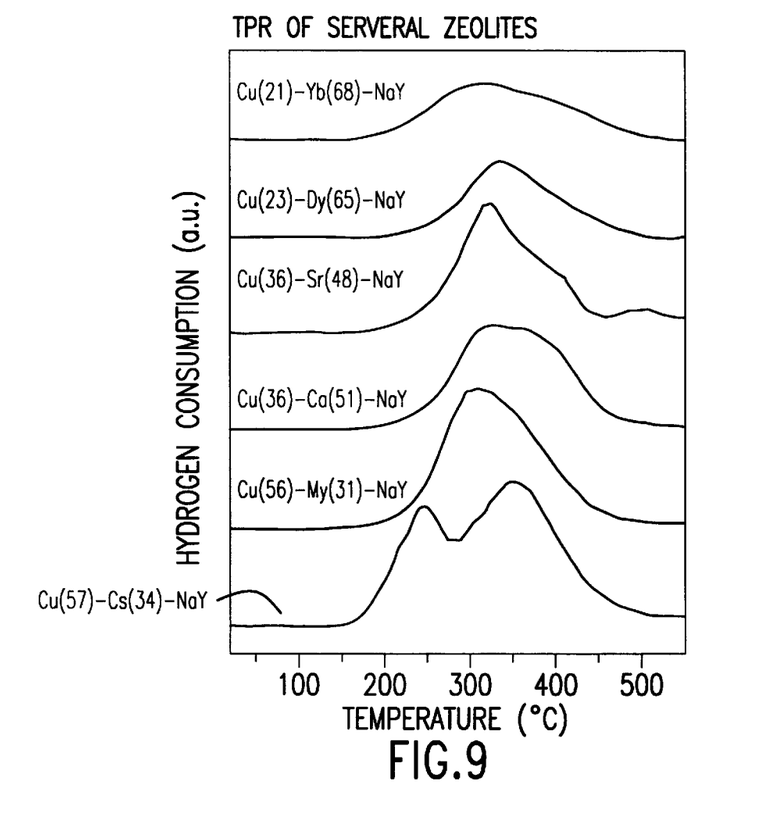

The table below reproduces the characteristics of the TPR diagrams obtained for CuM'NaY mixed faujasites containing various ions M'. $T_{p1}$ and $T_{p2}$ are respectively the temperatures of the reduction peaks $P_1$ and $P_2$. The areas $A_1$ and $A_2$ are obtained by Gaussian deconvolution of the low-temperatures (<800° C.) TPR profile. $A_1/A_2$ is the ratio of the areas of these peaks and $d_{M'}$ is the diameter of the ions in question. FIG. 9 reproduces these TPR profiles.

| Ions M' | $T_{p1}$ (° C.) | $T_{p2}$ (° C.) | $A_1/A_2$ | $d_{M'}$ (nm) |
|---|---|---|---|---|
| without M' ion | 222 | 327 | 0.26 | |
| Cs⁺ | 237 | 352 | 0.31 | 0.334 |
| Mg²⁺ | 307 | 377 | 1.74 | 0.132 |
| Ca²⁺ | 342 | 422 | 2.00 | 0.198 |
| Sr²⁺ | 317 | 397 | 2.47 | 0.224 |
| Dy³⁺ | 302 | 407 | 2.85 | 0.182 |
| Yb³⁺ | 337 | 427 | 1.93 | 0.172 |

The advantage of the SrCu—NaY, CaCu—NaY and DyCu—NaY mixed zeolites and their conformity to the specifications of the present invention are noted.

Example 8

DyCu—NaY

A mixed zeolite is prepared according to the operating method of Example 1, apart from the fact that instead of the copper nitrate solution of step 7) a dysprosium solution is used. The final product has the composition Cu(23)Dy(65)—NaY, which represents, by weight, Si=19.57%, Al=7.93%, Na=0.87%, Cu=2.14% and Dy=10.31%.

Figure 10:
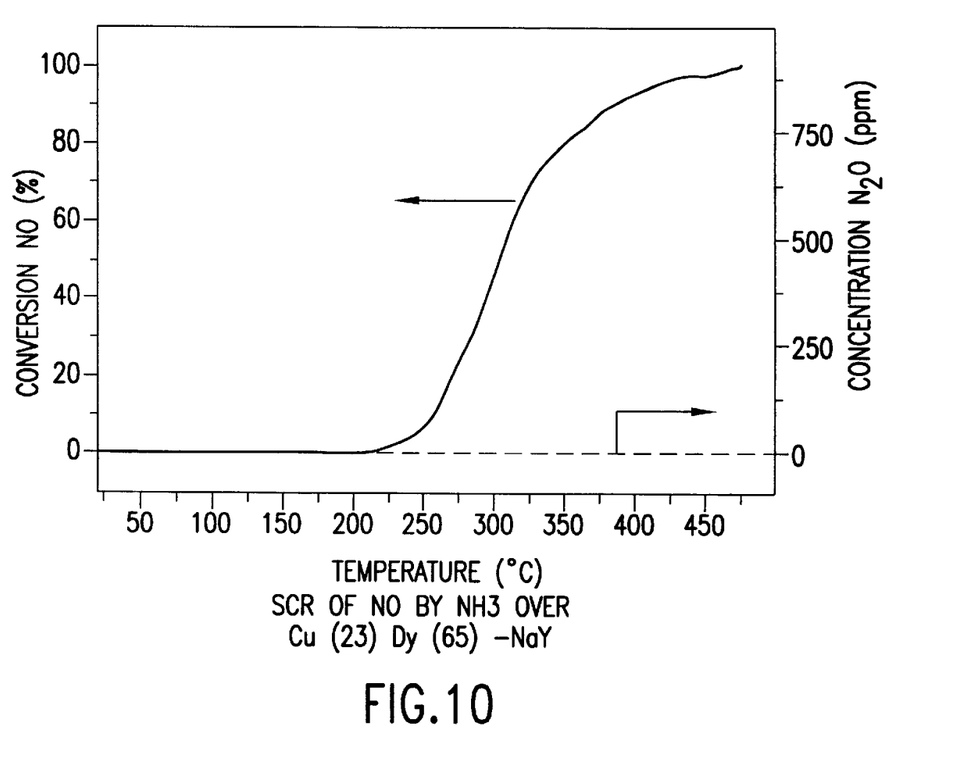

FIG. 10 of the NO/$N_2O$ SCR profiles shows the particular advantage of this catalytic composition.

Example 9

Lanthanide/copper Mixed Faujasite

A Cu(23)La(47)Pr(19)—NaY mixed zeolite is prepared according to the operating method of Example 1, apart from the fact that instead of the calcium nitrate solution a "Ladi" solution, ref. 960781 from R. P., is used, the lanthanide composition of which is 70% of lanthanum and 30% of praseodymium (% by weight).

A powder is obtained which is analysed as having the composition of a Cu(23)La(47)Pr(19)—NaY, namely, by weight, Si=18.56%, Al=8.20%, Na=0.66%, Cu=2.25%, La=6.56% and Pr=2.75%.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for the selective catalytic reduction (SCR) of nitrogen oxides using ammonia, comprising using as catalyst a partially copper-exchanged zeolite not generating nitrogen protoxide, said zeolite having a Si/Al ratio of 0.8 to 20, of which the structural arrangement of its $SiO_4$ and $AlO_4$ tetrahedra provides both small cavities accessible through windows having 6 tetrahedra and large cavities accessible through windows formed by at least 8 tetrahedra, of which the degree of copper exchange is from 5 to 60%, said zeolite being characterized by two waves of hydrogen consumption in temperature-programmed reduction, the first wave at a temperature below 800° C., the second wave at a temperature above 800° C., the hydrogen consumption corresponding to the peak of the second wave being substantially equal to half a mole of hydrogen per mole of copper present in said zeolite, the first wave being composed of two peaks $P_1$ and $P_2$ resolved by Gaussian deconvolution, the ratio $A_1/A_2$ of the areas corresponding to the peaks $P_1$ and $P_2$ respectively being greater than 1.5.

2. SCR process according to claim 1, wherein the catalyst is a cubic faujasite X or Y, which is represented by the formula in which FAU represents a cubic faujasite lattice with an Si/Al ratio of 0.8 to 20, M' is a metallic element of valency 2, 3 or 4, having an ion diameter of between 0.16 and 0.28 nm, M is selected from the group consisting of H⁺, Na⁺, and K⁺, x, y and z are the respective theoretical degrees of exchange of copper ions, M' ions and M ions, expressed as a percentage of the total exchange capacity of said faujasite, x, y and z having values:
   $5 \leq x \leq 60$,
   $20 \leq y \leq 70$,
   $z \leq 100-x-y$.

3. SCR process according to claim 1, wherein the catalyst is a cubic faujasite Y, which is represented by the formula $$Cu(x)M'(y)M(z)Y$$

in which
   Y represents a cubic faujasite with a Si/Al ratio of 0.8 to 20,
   M' is a metallic element of valency 2, 3 or 4, having an ion diameter of between 0.16 and 0.28 nm,
   M is selected from the group consisting of $H^+$, $Na^+$, and $K^+$,
   x, y and z are the respective theoretical degrees of exchange of copper ions, M' ions and M ions, expressed as a percentage of the total exchange capacity of said faujasite,
   x, y and z having values:
      $5 \leq x \leq 60$,
      $20 \leq y \leq 70$,
      $z \leq 100-x-y$.

4. SCR process according to claim 1, wherein the catalyst is a faujasite CuCaY.

5. SCR process according to claim 1, wherein the catalyst is a faujasite CuTrY, Tr representing a lanthanide or a mixture of lanthanides.

6. SCR process according to claim 1, wherein the catalyst is a zeolite which is represented by the formula $$Cu(x)M'(y)M(z)EMT$$

in which
   EMT represents a hexagonal faujasite EMT,
   M' is a metallic element of valency 2, 3 or 4, having an ion diameter of between 0.16 and 0.28 nm,
   M is selected from the group consisting of $H^+$, $Na^+$, and $K^+$,
   x, y and z are the respective theoretical degrees of exchange of copper ions, M' ions and M ions, expressed as a percentage of the total exchange capacity of the said faujasite,
   x, y and z having values:
      $5 \leq x \leq 60$,
      $20 \leq y \leq 70$,
      $z \leq 100-x-y$.

7. SCR process according to claim 1, wherein the catalyst is an intergrowth of a faujasite Y represented by the formula $$Cu(x)M'(y)M(z)Y$$

and of a faujasite EMT represented by the formula $$Cu(x)M'(y)M(z)EMT,$$

in which
   Y represents a cubic faujasite with a Si/Al ratio of 0.8 to 20,
   EMT represents a hexagonal faujasite,
   M' is a metallic element of valency 2, 3 or 4, having an ion diameter of between 0.16 and 0.28 nm,
   M is selected from the group consisting of $H^+$, $Na^+$, and $K^+$,
   x, y and z are the respective theoretical degrees of exchange of copper ions, M' ions and M ions, expressed as a percentage of the total exchange capacity of faujasite,
   x, y and z having values;
      $5 \leq x \leq 60$,
      $20 \leq y \leq 70$,
      $z \leq 100-x-y$.

8. SCR process according to claim 7, wherein the EMT is ZSM-3, ZSM-20, CSZ-1 or ECR-30.

9. SCR process according to claim 1, wherein the catalyst is an intergrowth of cubic faujasite FAU represented by the formula $$Cu(x)M'(y)M(z)FAU$$

and of a faujasite EMT represented by the formula $$Cu(x)M'(y)M(z) \; EMT,$$

in which
   FAU represents a cubic faujasite lattice of Si/Al ratio of 0.8 to 20,
   EMT represents a hexagonal faujasite,
   M' is a metallic element of valency 2, 3 or 4, having an ion diameter of between 0.16 and 0.28 nm,
   M is selected from the group consisting of $H^+$, $Na^+$, and $K^+$,
   x, y and z are the respective theoretical degrees of exchange of copper ions,
   M' ions and M ions, expressed as a percentage of the total exchange capacity of faujasite,
   x, y and z having values;
      $5 \leq x \leq 60$,
      $20 \leq y \leq 70$,
      $z \leq 100-x-y$.

10. Cu(x)M'(y)M(z)FAU mixed faujasite in which
   FAU represents a cubic faujasite lattice with an Si/Al ratio of 0.8 to 20,
   M' is a metallic element of valency 2, 3 or 4, having an ion diameter of between 0.16 and 0.28 nm,
   M is $H^+$, $Na^+$, or $K^+$
   x, y and z are the respective theoretical degrees of exchange of copper ions, M' ions and M ions, expressed as a percentage of the total exchange capacity of the said faujasite,
   x, y and z having values:
      $5 \leq x \leq 60$,
      $20 \leq y \leq 70$,
      $z \leq 100-x-y$,
   the said faujasite being characterized by two waves of hydrogen consumption in temperature-programmed reduction, the first wave at a temperature below 800° C., the second above 800° C.,
      the hydrogen consumption corresponding to the peak of the second wave being substantially equal to half a mole of hydrogen per mole of copper present in the solid,
      the first wave being composed of two peaks $P_1$ and $P_2$ resolved by Gaussian deconvolution, the ratio $A_1/A_2$ of the areas corresponding to the peaks $P_1$ and $P_2$ respectively being greater than 1.5.

11. Cu(x)M'(y)M(z)FAU mixed catalyst according to claim 10, wherein the M' ion is a calcium ion.

12. Cu(x)M'(y)M(z)FAU mixed catalyst according to claim 10, wherein the M' ion is a lanthanide ion or a mixture of lanthanide ions.

* * * * *